(12) United States Patent
Bernot

(10) Patent No.: US 11,196,307 B2
(45) Date of Patent: Dec. 7, 2021

(54) ELECTROMAGNETIC ASSEMBLY OF POLYPHASE STRUCTURE

(71) Applicants: FRANCECOL TECHNOLOGY, Saint Cyr sur Loire (FR); ZODIAC ACTUATION SYSTEMS, Auxerre (FR); MBDA FRANCE, LE Plessis-Robinson (FR)

(72) Inventor: Francois Bernot, Luynes (FR)

(73) Assignees: FRANCECOL TECHNOLOGY, Saint Cyr Sur Loire (FR); ZODIAC ACTUATION SYSTEMS, Auxerre (FR); MBDA FRANCE, Le Plessis-Robinson (FR)

(*) Notice: Subject to any disclaimer, the term of this patent is extended or adjusted under 35 U.S.C. 154(b) by 0 days.

(21) Appl. No.: 16/474,033

(22) PCT Filed: Dec. 27, 2017

(86) PCT No.: PCT/EP2017/084633
§ 371 (c)(1),
(2) Date: Jun. 26, 2019

(87) PCT Pub. No.: WO2018/122255
PCT Pub. Date: Jul. 5, 2018

(65) Prior Publication Data
US 2020/0006992 A1 Jan. 2, 2020

(30) Foreign Application Priority Data
Dec. 27, 2016 (FR) .................................... 1663405

(51) Int. Cl.
*H02K 1/14* (2006.01)
*H02K 1/26* (2006.01)
*H02K 1/16* (2006.01)

(52) U.S. Cl.
CPC ............. *H02K 1/146* (2013.01); *H02K 1/165* (2013.01); *H02K 1/265* (2013.01)

(58) Field of Classification Search
CPC ......... H02K 1/146; H02K 1/265; H02K 1/165
(Continued)

(56) References Cited

U.S. PATENT DOCUMENTS 4,315,171 A * 2/1982 Schaeffer ............... H02K 41/03
310/216.109
6,384,496 B1 5/2002 Pyntikov et al.
(Continued)

FOREIGN PATENT DOCUMENTS

| EP | 1505714 B1 | 2/2005 |
|---|---|---|
| WO | 90/01823 A1 | 2/1990 |
| WO | 03/085807 A1 | 10/2003 |

OTHER PUBLICATIONS

International Search Report and Written Opinion, dated Feb. 7, 2018, issued in priority International Patent Application No. PCT/EP2017/084633, filed Dec. 27, 2017, 10 pages.
(Continued)

*Primary Examiner* — John K Kim
(74) *Attorney, Agent, or Firm* — Christensen O'Connor Johnson Kindness PLLC

(57) ABSTRACT

The present invention relates to an electromagnetic assembly of polyphase structure, said assembly including: a yoke comprising an electromagnetic body; a plurality of spaced-apart blocks that protrude with respect to one of the carrier faces of the yoke and that are arranged, consecutively, along the periphery of the carrier face of the yoke; and at least one winding that is associated with the blocks, wherein there is only one yoke, the plurality of blocks is arranged in at least two groups of blocks (A, B, C) in which two consecutive blocks of a given group of blocks (A, B, C) are spaced apart by an inter-block distance (E), and each group of blocks (A,
(Continued)

B, C) is separated from the adjacent group of blocks (A, B, C) by an inter-group distance (D) that is different from the inter-block distance (E).

13 Claims, 6 Drawing Sheets

(58) Field of Classification Search
USPC .................. 310/179, 180, 216.079, 216.091
See application file for complete search history.

(56) References Cited

U.S. PATENT DOCUMENTS

| | | | | |
|---|---|---|---|---|
| 6,492,756 | B1* | 12/2002 | Maslov | B62M 6/45 |
| | | | | 310/156.12 |
| 2003/0193263 | A1* | 10/2003 | Maslov | B62M 6/40 |
| | | | | 310/254.1 |
| 2005/0073273 | A1* | 4/2005 | Maslov | H02P 6/28 |
| | | | | 318/437 |
| 2005/0116575 | A1* | 6/2005 | Zepp | H02K 1/148 |
| | | | | 310/216.102 |
| 2007/0182266 | A1* | 8/2007 | Nashiki | H02K 1/08 |
| | | | | 310/179 |
| 2011/0285227 | A1* | 11/2011 | Kimiabeigi | H02K 3/12 |
| | | | | 310/71 |
| 2012/0074797 | A1 | 3/2012 | Petter et al. | |
| 2020/0006992 | A1* | 1/2020 | Bernot | H02K 1/165 |

OTHER PUBLICATIONS

Zhao, W., et al., "New Practical Maintenance Techniques for Diesel and Gasoline Generators," Fujian Science and Technology Press, Mar. 2007, pp. 83-84.

* cited by examiner

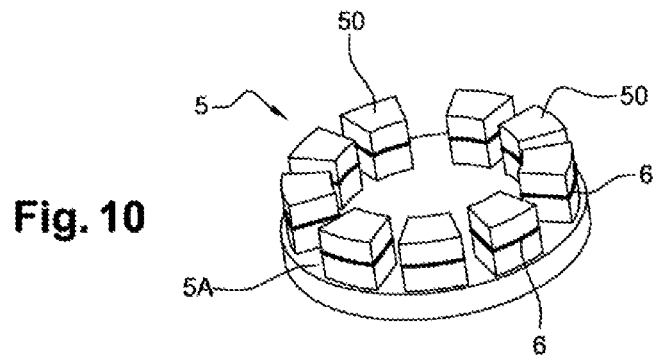
Fig. 10
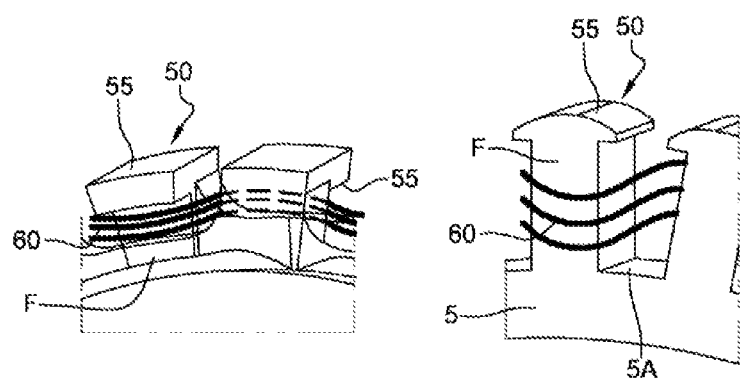
Fig. 11a  Fig. 11b
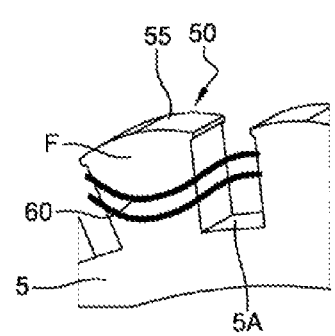 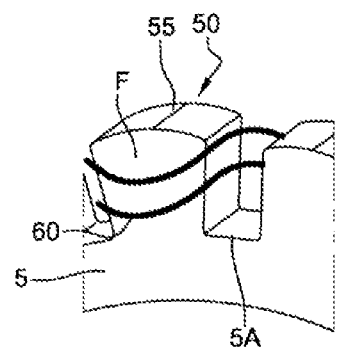
Fig. 11c  Fig. 11d

ELECTROMAGNETIC ASSEMBLY OF POLYPHASE STRUCTURE

CROSS-REFERENCE TO RELATED APPLICATIONS

The present disclosure is a 371 application of International Application No. PCT/EP2017/084633, filed Dec. 27, 2017, which claims priority to French Patent Application No. 1663405, filed on Dec. 27, 2016, the content of which is incorporated herein by reference in its entirety.

The present invention relates to an electromagnetic assembly with polyphase structure with winding.

What is meant, with reference to the electromagnetic assembly with winding, by a polyphase structure, is an electromagnetic assembly with winding, the number of phases of which is greater than one.

More specifically, the present invention will be described with reference to a use of such an electromagnetic assembly as a stator or rotor of an electric motor, notably having a motor and/or generator mode of operation, although without being limited thereto.

The present invention can be applied to any use of such an electromagnetic assembly in a rotary electric machine, other than a motor, and to any rotary device using an electromagnetic field frame that exhibits the features of the present invention.

For example, the present invention also finds an application in the field of position sensors, speed sensors or acceleration sensors.

In the known way, an electromagnetic field frame is usually of solid or hollow cylindrical shape extending along a longitudinal axis (referred to as the z-axis) and comprises an alternation of salient magnetic poles consisting of an alternation of studs (or teeth) and of notches, the studs projecting from the interior or exterior face of the body of the electromagnetic field frame and being equidistant.

In addition, a monophase structure electromagnetic field frame comprising a single winding extending from an electrical power supply input to an electrical power supply output and wound around each stud, referred to as magnetic, so as to create an inlet flux and an outlet flux alternately between the successive and equidistance studs is known. The winding may be produced as a wavy winding, namely one that passes from one stud to another changing face at each stud, or as an imbricated winding, namely one that completely surrounds each of the studs. The winding has one or more turns.

The monophase structure electromagnetic field frame produced in this way is intended to be positioned facing an electromagnetic element, for example made up of magnets, and some distance away therefrom so as to create an electromagnetic airgap surface.

In order to manufacture a polyphase electric machine, several monophase structure electromagnetic field frames C1 to C3 as described hereinabove and stacked along the z-axis are assembled as illustrated in FIG. 1. Each monophase structure electromagnetic field frame C1 to C3 is provided with a plurality of equidistant studs P on the periphery of the electromagnetic field frame and with its associated winding forms a phase. By assembling three electromagnetic field frames, the assembly thus created forms a three-phase structure.

In order to avoid any short circuit, it is a sought-after objective for the respective windings of the monophase structure electromagnetic field frame not to be in contact with one another. Thus, by stacking the electromagnetic field frames fitted with their winding, care is taken to space these apart in order to prevent them from touching.

In addition, the electromagnetic field frames are arranged with respect to one another in such a way as to ensure an angular offset between the studs of two consecutive electromagnetic field frames. Such an angular offset is equal to $$360°/(2*Np*Nphases),$$

where $Np$ is the number of magnetic poles, and $Nphases$ is the number of monophase structure electromagnetic field frames (also referred to as the number of phases).

In an electric motor, there is a constant desire to increase the number of phases, above one, which allows the starting of the electric motor, or to improve the electric shape factor of the electric motor in order to reduce excessive pulsing of the torque.

This is generally achieved by assembling a plurality of monophase structure electromagnetic field frames. However, such an assembly increases the bulk of the motor along the z-axis because it is necessary to space apart the monophase structure wound electromagnetic field frames. In particular, each phase added increases the initial length of the motor in order particularly to maintain a space between each electromagnetic field frame.

Now, in certain applications, the bulk may present a problem and it is thus desirable to provide polyphase motors the volume of which is as small as possible.

Furthermore, added to this are difficulties with designing and maintaining such an assembly of a plurality of monophase structure electromagnetic assemblies.

Finally, the cost of manufacture of such a motor quickly increases.

The present invention therefore seeks to provide a polyphase structure electromagnetic assembly that does not have the abovementioned drawbacks. A particular object of the present invention is to minimize the volume occupied by such an assembly. The present invention also offers the advantage, through its use in an electric motor, of making it possible to increase the torque of the motor, without affecting the bulk. Further advantages of the polyphase structure electromagnetic assembly of the present invention will be detailed in the description which follows.

According to the present invention, the polyphase structure electromagnetic assembly comprises a field frame having an electromagnetic body and a plurality of spaced-apart studs projecting from a support face of the field frame, this support face of the field frame advantageously being one of the faces of the field frame, and arranged consecutively along the periphery of the support face of the field frame, as well as a winding associated with the studs. In addition, the field frame is unique, which means to say that the assembly comprises just the one field frame, and the plurality of studs is arranged in at least two groups of studs, in which two consecutive studs of the one same group of studs are spaced apart by an interstud distance and each group of studs is separated from the adjacent group of studs by an intergroup distance distinct from the interstud distance.

What is more, advantageously, a winding is associated with each group of studs.

What is meant by "adjacent group" is the group of studs that immediately follows after a group of studs with reference to the consecutive arrangement of the studs and groups of studs.

Depending on the structure of the field frame, the studs may have different shapes and sizes.

For preference, the studs of the field frame all have the same shape.

Because the geometric shape of a stud may vary according to the field frame and according to the target application, the intergroup distance is considered as being the angular distance separating the median axes perpendicular to the support face of two consecutive studs belonging to two adjacent groups. The interstud distance is considered as being the angular distance separating the median axes perpendicular to the support face of two consecutive studs belonging to the one same group.

According to one feature, the body of the field frame is annular, or cylindrical in one or two annular parts, or cylinders butted together, in particular along the longitudinal axis of the cylinder, or discoidal, or parallelepipedal.

If the magnetic field frame has a body of discoidal or annular shape, the support face from which the studs extend as projections is of preferably circular geometry. In addition, the studs are arranged consecutively along the circular periphery of the support face. However, other geometries of stud are conceivable, particularly frustaconical studs.

If the magnetic field frame is of linear shape, which means to say if it is of parallelepipedal shape, the studs are arranged consecutively along one straight side of the field frame.

Thus, on the one same surface and via a unique field frame, it is possible to obtain a polyphase structure electromagnetic assembly without, as was the case in the prior art, needing to stack several electromagnetic field frames in succession along the z-axis. In addition, it is thus possible to dispense with the space separating two successive field frames.

As a consequence, the present invention makes it possible to create a polyphase structure electromagnetic assembly that is compact and reduced in size along the z-axis. Ultimately, the present invention advantageously allows a reduction in the overall bulk of a polyphase structure electromagnetic assembly.

In the remainder of the description, whatever the shape of the field frame, the z-axis means the axis which corresponds to the axis along which several monophase structure field frames would need to be stacked axially if the assembly of the invention did not offer the particular arrangement of the electromagnetic studs.

The z-axis is also perpendicular to the magnetic flux induced in the airgap afforded when another electromagnetic element is placed opposite and some distance from the electromagnetic studs, and when an electric current is applied to the winding.

In the case of an annular or discoidal field frame, the z-axis is perpendicular to the radial plane. For a parallelepipedal field frame, also referred to as being linear, the z-axis is perpendicular to the longitudinal direction of the studs.

For a cylindrical field frame made in at least two annular or cylindrical parts butted together, each part comprises a respective number of studs distributed in a spaced-apart manner so that the space between two consecutive studs of one part is able to accommodate a stud of another part. The studs of the butted-together annular or cylindrical parts are thus combined top to tail and parallel to one another while at the same time conforming to the claimed intergroup and interstud distances.

What is meant by a "winding associated with each group of studs" in the description that follows is a winding having an electric power supply input and an electric power supply output for each group of studs or for each combination of subgroups. A combination of subgroups is defined later on.

The configuration as groups of studs, combined with an intergroup distance distinct from the interstud distance, makes it possible, when the winding is electrically powered, to afford a plurality of electric phases with an electric phase shift between the phases, providing a polyphase structure electromagnetic assembly.

As a result, the polyphase structure electromagnetic assembly according to the present invention is of "monoblock" type, compacting the phases into one single annular, discoidal or parallelepipedal volume without the need to stack a plurality of electromagnetic field frames in parallel and spaced-apart consecutive planes. What is meant by "monoblock" is that the polyphase structure electromagnetic assembly comprises just the one single field frame forming a unit mass with the groups of studs.

The polyphase structure is obtained from one unique single field frame. The unit mass of the electromagnetic assembly of the invention affords a polyphase structure in a bulk that is smaller than would have been needed for an assembly of the prior art for which the polyphase structure is obtained by stacking and spacing apart several monophase structure field frames.

Such a monoblock design of the polyphase structure electromagnetic assembly offers additional and/or alternative advantages to the advantage of reduced bulk, in particular:

it becomes possible to concentrate the same number of phases in a smaller bulk and to provide an axial length that allows the torque of the motor to be increased;

the volume of the winding is reduced, thus making it possible to reduce the quantity of electric wire, generally made of copper, used, thereby also decreasing manufacturing costs;

the length of electric wire for the total winding for all of the phases is decreased, thus making it possible to reduce the electrical resistance, and therefore reduce the losses through the Joule effect;

a stud arrangement is defined that is such that the studs are no longer equidistant over the entire circumference involving an angular offset from the other magnetic element intended to be positioned opposite, for example a rotor if the electromagnetic assembly of the invention is a stator, this then making it possible to reduce the "cogging" restraining torque of the motor, thereby making it easier to set the rotor in rotation;

the maintenance of the electromagnetic assembly, thus making it possible to make the electric motor that incorporates such an electromagnetic assembly easier to maintain;

the polyphase structure electromagnetic assembly is easy to assembly and dismantle;

the manufacturing costs are reduced;

the risks of wear caused by vibration in high-speed motors are reduced.

According to another feature, the polyphase structure electromagnetic assembly comprises several phases so that each phase of the polyphase structure electromagnetic assembly corresponds either to each of the groups of studs, the groups being considered consecutively, and a distinct winding being associated with each group, or to at least two distant groups (two groups not following on from one another consecutively) associated with the one same winding distinct from the winding of the other groups.

The combination of at least two distant groups associated with the one same winding is defined in the invention as subgroups.

When the field frame is annular or discoidal and two subgroups constitute a phase, the two subgroups are arranged diametrically opposite.

When the field frame is parallelepipedal and two subgroups constitute a phase, the two subgroups are arranged one on each side of the first group of phases formed of subgroups.

When the polyphase structure electromagnetic assembly comprises, as is preferred, groups of studs distributed in subgroups as mentioned hereinabove, the intergroup distance, defined above and corresponding to two adjacent groups, remains the same.

Thus, the intergroup distance is also the distance separating an end stud, along the median axis perpendicular to the support face, of a first subgroup of a group, from the stud immediately after, along the median axis perpendicular to the support face, of the subgroup of another group arranged adjacent to the first group.

According to one particular embodiment, the intergroup distances are identical over the entire field frame.

When each of the intergroup distances is the same over the entire periphery of the field frame, it is substantially equal to an electrical angle which corresponds to 180°/Nphases, when the number of phases is odd, and
360°/Nphases, when the number of phases is even, Where Nphases is the number of phases, in particular considering that the interstud distance of each group or each subgroup is identical and is equal to 180° electrical.

An electrical angle is defined as being equal to a full mechanical revolution, namely 360°, divided by the number of pole pairs. When the structure is linear, the electrical angle is defined as having a value equal to 360° to the distance separating two consecutive pole pairs.

Thus, for preference, the groups or subgroups of studs are distributed in a balanced manner, with each group or subgroup being equidistantly spaced, on the surface of the field frame, the intergroup distance then being the same.

Such an arrangement makes it possible to obtain equilibrium of the radial electrical forces for an electromagnetic assembly with an annular or discoidal field frame.

For preference, according to the target application, particularly for a motor, the number of subgroups of studs is preferably an even number and/or the number of groups corresponding to the number of phases is preferably an odd number.

By way of example, the polyphase structure electromagnetic assembly is a three-phase structure and comprises
either three groups of studs, each of the groups corresponding to one phase,
or three pairs of subgroups of studs, each pair of subgroups corresponding to one phase and the two subgroups of each pair being arranged diametrically opposite and associated with the one same winding.

In another exemplary embodiment, the polyphase structure electromagnetic assembly has a five-phase structure and comprises five groups of studs each associated with a distinct winding.

According to one preferred feature, each group of studs or each subgroup comprises an identical number of studs, either even or odd.

The polyphase structure electromagnetic assembly comprises a winding per group of studs or per combination of subgroups, such as notably per pair, each winding being formed by one or more turns associated with each of the studs. The windings of the groups may be connected in series or in parallel or in any other way.

A winding may be produced
in a wavy fashion, that is to say passing from one stud to another, passing alternately from one pole face of one stud to an opposite pole face for the next stud, or
in an imbricated manner, passing fully around each of the studs.

What is to be understood, in the known way, by pole faces is the faces of the studs that extend in planes perpendicular to the z-axis.

In one particular embodiment, certain studs are not wound, or else take two windings.

Advantageously, the windings are intended to be electrically powered by a balanced polyphase current. However, it is possible for the current not to be balanced.

For preference, the current supplied to the winding of each group or combination of subgroups for each phase is angularly set in relation to the electrical phase angle between the phases.

Moreover, the current passing through each winding may be a sinusoidal wave, triangular wave, square wave and notably a three-level squarewave current, etc.

By way of nonlimiting examples, the studs may have various shapes such as a cylindrical shape of circular or polygonal base, or a mushroom shape, or a flared solid shape preferably diverging toward the opposite side from the support face, and/or a solid shape having a recess on at least one of the pole faces, preferably having a single recess such that each recess of two consecutive studs is positioned alternately on each pole face, notably to combine the winding in a wavy zigzag.

For preference, the studs of the one same polyphase structure electromagnetic assembly have the same shape.

According to yet another feature, one or more studs are attached removably against the field frame, particularly by insetting with or without clearance and/or bonding and/or using an interface and securing element. In particular, the studs may have a base intended to collaborate with the support face in an engagement of the dovetail type.

In particular, each stud has a surface opposite to the support face of the field frame and intended to face an airgap, having a convex shape, so as to afford an airgap of variable distance. Such a geometry allows the induced voltage to be sinusoidal in form.

The present invention also relates to a device comprising such a polyphase structure electromagnetic assembly and an electromagnetic element arranged opposite the airgap, such a one involving magnets, arranged opposite and some distance away in order to create an airgap between the element and the assembly.

In other alternative embodiments of the present invention, it is possible to position facing the polyphase structure electromagnetic assembly, opposite the airgap, a set of magnetic blocks that concentrate the magnetic flux, or a cage substantially similar to that of caged induction motors, or a set of short-circuiting coils, or a single phase or polyphase wound armature, or an unwound armature such as used in variable reluctance machines, comprising a number of teeth, which armature comprises a number of poles distributed substantially equally at the periphery of the airgap, and distant from one another by 180° electrical.

When the field frame of the polyphase structure electromagnetic assembly is cylindrical in shape, the studs project with respect to the cylindrical surface either internally or externally. In a use with an electromagnetic element opposite and spaced away, the field frame will then respectively be either said to be external and arranged around the electromagnetic element or said to be internal with the electromagnetic element arranged around it.

When the field frame of the polyphase structure electromagnetic assembly is of discoidal or parallelepipedal (or linear) form for an electric motor application, the field frame will be arranged either to the right or to the left.

In an alternative embodiment to the present one, it is possible for the phases not to have the same number of studs. In one particular configuration, it is possible for the subgroups of studs not to all comprise the same number of studs.

Depending on the application and the embodiment of the electromagnetic element associated with the polyphase structure electromagnetic assembly of the invention, the field frame will be either fixed or rotary.

The present invention also relates to a machine comprising the polyphase structure electromagnetic assembly of the invention, such as a rotary or static electric machine, notably a DC machine, synchronous with magnets, synchronous with wound rotor, asynchronous with squirrel cage rotor, asynchronous with wound rotor, stepping (known as variable reluctance), an electric motor, an alternator, a starter, a retarder, a position sensor, a speed sensor, an acceleration sensor or any other application.

The present invention also applies to a fixed or mobile armature placed inside or outside the armature opposite or to the right or to the left thereof. The armature opposite may comprise magnets, electromagnets, unpowered studs. In addition, the armature opposite may comprise a "squirrel cage".

In addition, according to the present invention, the windings forming the electric phases of the machine may be split into identical or different subassemblies.

The present invention will be better understood and further features and advantages will become still further apparent from reading the detailed description which follows comprising embodiments given by way of illustration with reference to the attached figures, given by way of nonlimiting example, which may serve to supplement the understanding of the present invention and the description of how it is embodied and, where appropriate, contribute to the definition thereof, and in which:

FIGS. 9a and 9b are respectively a view in perspective and a view in cross section of another example of an electromagnetic assembly of the present invention, the field frame being of cylindrical overall shape;

FIG. 9c is an exploded view of the electromagnetic assembly of FIG. 9a;

FIG. 10 is a perspective view of a field frame of discoidal shape of the polyphase electromagnetic assembly of the present invention according to an alternative form of the studs;

FIGS. 11a to 11d illustrate examples of geometric shapes of studs of the electromagnetic assembly of the present invention;

Figure 1:
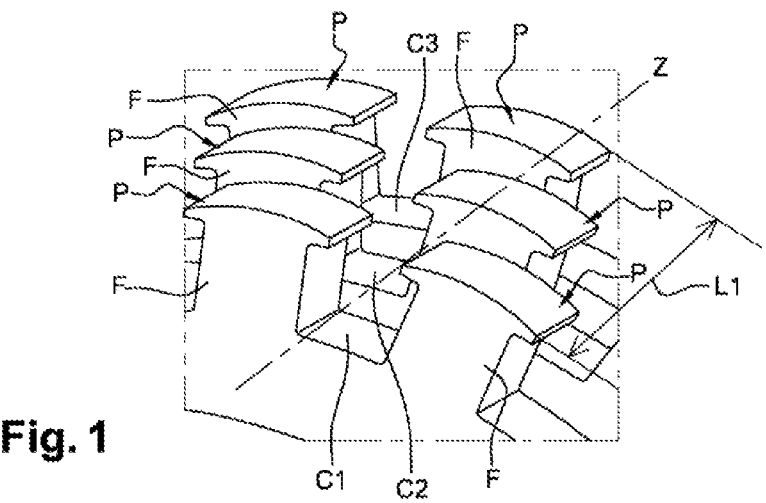
FIG. 1 is a detailed perspective view of a polyphase structure electromagnetic assembly of the prior art.

FIG. 1 illustrates a polyphase structure, in this instance three-phase in the example presented in FIG. 1, electromagnetic assembly of the prior art. Such an electromagnetic assembly comprises three annular electromagnetic field frames C1, C2 and C3, respectively provided with equidistant studs P on their periphery. Each electromagnetic field frame C1, C2 and C3 is intended to correspond to one phase.

The electromagnetic field frames C1, C2 and C3 are stacked along a z-axis and are spaced apart to allow the incorporation of an associated winding (not illustrated) arranged around the studs P of each electromagnetic field frame C1, C2 and C3 so that the windings do not touch at the pole faces F of the studs P. The pole faces F of the studs P are perpendicular to the z-axis.

The electromagnetic field frames C1, C2 and C3 are arranged relative to one another in such a way as to provide an angular offset between the studs P of two consecutive field frames C1 and C2 on the one hand, and C2 and C3 on the other. Arranged in this way, along the z-axis, the assembly has a length L1.

Figure 2:
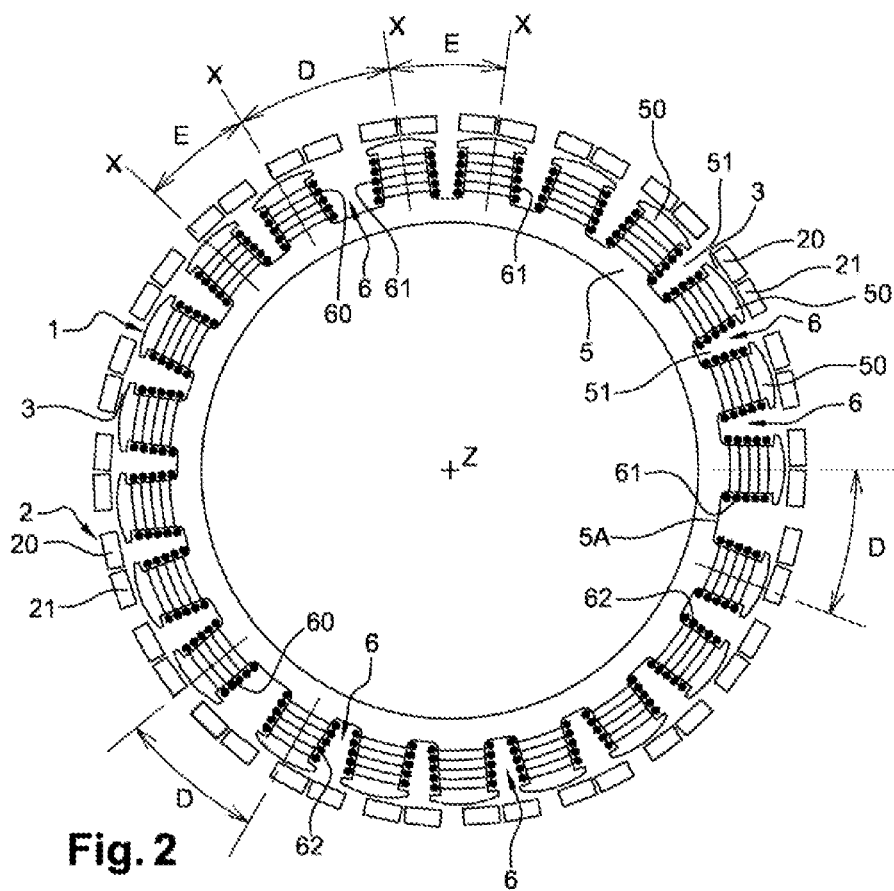
FIG. 2 depicts a view in cross section of one exemplary embodiment of a polyphase structure electromagnetic assembly according to the present invention, associated with an electromagnetic element of the magnet structure type, having an airgap, in order to produce a device of the electric motor type.
Figure 3:
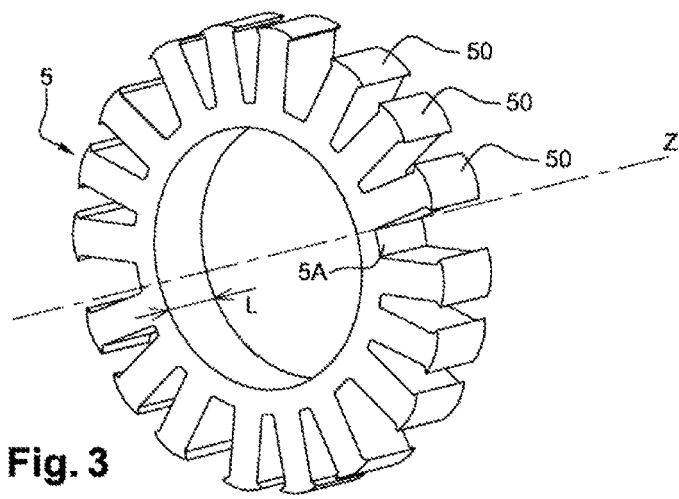
FIG. 3 is a perspective view of a field frame of the polyphase structure electromagnetic assembly of FIG. 2.
Figure 4:
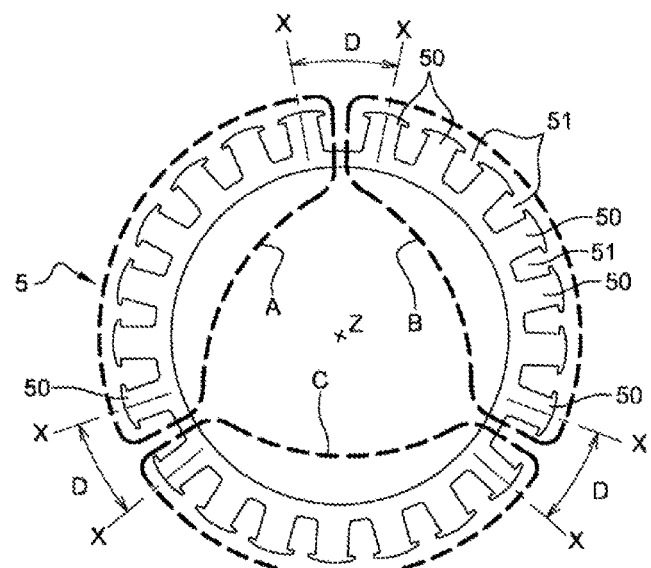
FIG. 4 is a view in cross section of the field frame of FIG. 3.
Figure 5:
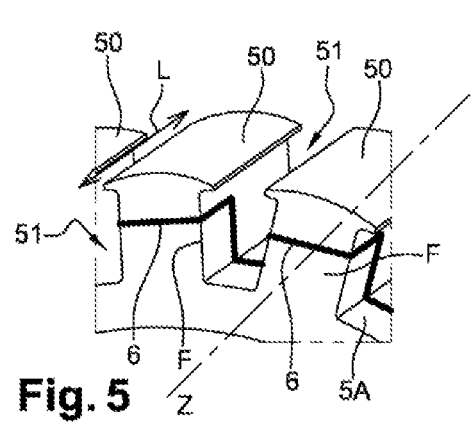
FIG. 5 is a detailed perspective view of the field frame of FIG. 3.

FIG. 2 shows a polyphase structure electromagnetic assembly 1 according to the present invention and of which a field frame is illustrated in FIGS. 3 to 5.

More specifically, FIG. 2 shows a polyphase structure electromagnetic assembly 1 according to the present invention in a configuration in which each phase is made up of a group each comprising seven teeth.

The polyphase structure electromagnetic assembly 1 is intended to occupy a smaller volume than the polyphase structure electromagnetic assembly of the prior art shown in FIG. 1, particularly by achieving a shorter length L along the z-axis, while at the same time affording equivalent operational results. Such a benefit is obtained because the windings, notably the winding overhangs of such windings, of the various phases are situated in the one same cylindrical zone, thereby eliminating any axial interference between them, and making it possible to shorten the electromagnetic assembly.

It should be noted that, in FIG. 2 et seq relating to the polyphase structure electromagnetic assembly 1 of the present invention, the structural and/or functional elements that are common to the various embodiments may exhibit the same references. Thus, unless mentioned otherwise, such elements have identical structural, dimensional and material properties.

The present invention is specific to the polyphase structure electromagnetic assembly 1 intended to be used notably as a stator in an electric motor, although without being limited to such an application. The polyphase structure electromagnetic assembly 1 may also be used to form an armature of a DC electric machine, a synchronous machine with magnets, a wound rotor synchronous machine, an asynchronous squirrel cage rotor machine, an asynchronous wound rotor machine, a stepping (known as variable reluctance) machine, an alternator, a starter, a retarder, a position sensor, a speed sensor, an acceleration sensor, etc.

The polyphase structure electromagnetic assembly 1 of the present invention, for the purposes of use, is, for example, a stator of annular overall shape and is associated on its external periphery, as shown in FIG. 2, with a magnetic element 2, advantageously a rotor 2, facing and some distance away so as to form an airgap 3.

The magnetic element 2 consists, by way of example, of a plurality of pairs of magnets 20, 21 arranged, on the one hand, side by side and, on the other hand, opposite and some distance away from the polyphase structure electromagnetic assembly 1. Each pair of magnets 20, 21 corresponds to a magnetic pole.

According to the target application, the magnetic element 2 opposite the electromagnetic assembly 1 may be made up of unpowered studs, notably in the context of a variable reluctance electric machine or of a squirrel cage, notably in the context of an asynchronous electric machine, or of a coil powered with direct current, notably in the case of a synchronous electric machine, or of a coil powered with alternating current, notably in the context of an induction electric machine, or of a short-circuiting coil, notably in the context of an asynchronous electric machine.

The magnets or the coil of the electromagnetic element may be mounted on a plain surface or arranged in slots formed at the surface of the magnetic-material body of the electromagnetic element 2.

The polyphase structure electromagnetic assembly 1 comprises, according to the present invention, a single unique field frame 5 of which the body is annular with a plurality of studs 50 projecting from one of the faces 5A of the field frame 5, referred to as the support face 5A of the field frame 5. In the embodiment depicted, the support face 5A of the field frame 5 is an external face.

In addition, a winding 6 is associated with each of the studs 50.

FIGS. 3 and 4 illustrate one exemplary embodiment of the field frame 5 from FIG. 2. More particularly, FIG. 3 illustrates the exemplary embodiment of the field frame 5 of FIG. 2 in a configuration in which each phase is formed of two diametrically opposite subgroups each one comprising three teeth.

The field frame 5 is, in the exemplary embodiment, of annular shape with a median axis corresponding to the z-axis which is perpendicular to a radial plane of the field frame 5. The studs 50 project with respect to the external face 5A.

Figure 6:
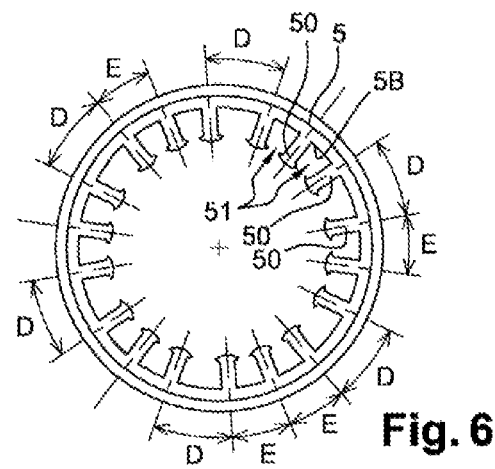
FIG. 6 is a view from above of a field frame of a polyphase structure electromagnetic assembly of the present invention according to an alternative form of embodiment relating to the layout of the studs.

As an alternative, depending on the use, the studs 50 project with respect to an internal face 5B, acting as the support face 5B, of the body of the field frame 5, as shown for example in the exemplary embodiment of FIG. 6.

The field frame 5 is preferably made up of an assembly, particularly by riveting, of sheets of ferromagnetic material stacked axially along the z-axis.

The studs 50 constitute volumes that project from the support face 5A or 5B of the field frame 5 and which are separated by slots 51. As will be seen later on, the studs 50 may adopt various shapes. By contrast, for the one same electromagnetic assembly according to the present invention, the studs 50 of the field frame 5 preferably all have the same shape.

In one particular embodiment, the studs 50 are formed as one with the body of the field frame 5 because they are manufactured in one piece with the body of the field frame 5 from precut metal sheets or from powder, notably a ferromagnetic powder agglomerated particularly by pressing, sintering or any other method, and the periphery of which follows the geometry of the body of the field frame 5 and of the studs 50.

As an alternative, once it has been obtained, the monoblock component comprising the studs 50 and the field frame 5 may be split into several identical or different subassemblies in order to make assembly and winding thereof easier.

According to another complementary or alternative variant form of embodiment, all the studs 50 or some of the studs 50 are removable. With this embodiment, the studs 50 are associated with the body of the field frame 5 by insetting with or without clearance and/or by bonding and/or using an interface and securing element.

The body of the field frame 5 preferably has accommodating housings to accommodate a base of the studs 50, particularly having a shape of mutual collaboration with the shape of the base of the studs 50, for example in the shape of a dovetail. The depth of the accommodating housings is preferably limited to 10 mm, and in particular is of the order of 1 mm. The removability of the studs 50 notably offers the advantage of making it easier to insert the winding.

Through an annular shape and the winding being wound around the studs 50, the magnetic flux, when the winding 6 is powered with current, is intended to be oriented substantially radially in the airgap 3. What is meant by a radial direction for the electromagnetic assembly according to the present invention is a direction that corresponds to a direction that is radial with respect to the field frame 5.

The essential specific feature of the present invention notably relates to the unique field frame 5 of the electromagnetic assembly 1 and to the arrangement of the studs 50 on the field frame 5, the distribution of which studs will be detailed later on.

Compared to FIG. 1, the field frame 5 according to the present invention, as illustrated in FIGS. 2 to 4 and in detailed view of FIG. 5, provides a polyphase structure electromagnetic assembly in which the field frame 5 is a unit field frame, unlike the plurality of field frames C1 to C3 needed in the embodiment of the prior art shown in FIG. 1.

As shown notably in FIG. 5, the field frame 5 of the present invention extends over a length L in the z direction which is shorter than the length L1 of the field frame of the prior art in FIG. 1, for the same circumference of field frame(s). Thus, advantageously, for the same circumference of field frame, the three-phase structure electromagnetic assembly of the present invention has a length L 20% shorter than the length L1 of the assembly of FIG. 1.

According to the present invention, with reference to FIGS. 2 to 4, the studs 50 are arranged in several groups of studs, for example in three groups A, B and C, as indicated schematically in FIG. 4 by dotted lines. Each group of studs A, B, C corresponds to one electric phase.

In the exemplary embodiment shown, the three-phase structure electromagnetic assembly has three groups to provide a three-phase structure. Each group of studs A, B, C is separated from the next adjacent group of studs by an intergroup distance D. The intergroup distance D is, according to one particular configuration, distinct from an interstud distance E, or spacing E, separating two consecutive studs 50 of the one same group of studs. The intergroup distance D and the interstud distance E are to be understood considering a median axis x of each stud in the direction perpendicular to the plane of the support face 5A or 5B.

The interstud distance E between two studs 50 of the same group of studs is preferably identical. Alternatively, according to particular exemplary embodiments, the interstud distance E of the one same group may be different.

In the example of FIGS. 2 to 5, each phase of the polyphase structure electromagnetic assembly 1 corresponds to a single group of studs. By way of example, the three-phase structure electromagnetic assembly 1 of FIGS. 2 to 4 comprises twenty-one studs distributed in three consecutive groups A, B and C of seven studs, each of the groups A, B and C of studs being intended to correspond to one phase.

The winding 6 of the electromagnetic assembly 1 is split into distinct groups of winding 60, 61 and 62 and notably three groups of winding 60, 61 and 62, each respectively associated with each of the groups of studs, notably three groups of studs.

The configuration in groups of studs, combined with an intergroup distance D distinct from the interstud distance E separating two studs 50 of the same group of studs 50, makes it possible, when the groups of winding 60 to 62 are electrically powered, to achieve an electrical phase shift between the phases providing a polyphase, in this instance three-phase, structure electromagnetic assembly.

The polyphase structure electromagnetic assembly 1 as illustrated in the figures has a three-phase structure. Thus a polyphase structure is achieved on a unique field frame 5.

The polyphase structure electromagnetic assembly forms a monoblock assembly, which means to say one having magnetic poles associated with a single field frame, unlike in the prior art illustrated in FIG. 1 which comprises several field frames assembled consecutively along the z-axis, each one of the field frames with its studs forming one single phase.

The winding 6, and, respectively, each group of winding 60, 61, 62, associated with each group of studs 50 is an electrical conductor consisting of an electric wire or of several electric wires gathered together, insulated or not insulated from one another, to form just one single electric wire. The electric wire may have a solid or hollow cross section, may have a flat, hexagonal, round, square, rectangular or any other regular or irregular cross-sectional shape. The electric wire is associated with each stud making one or more turns (for example twenty-four turns in one exemplary embodiment) around same.

Figures 9A, 9B, 9C:
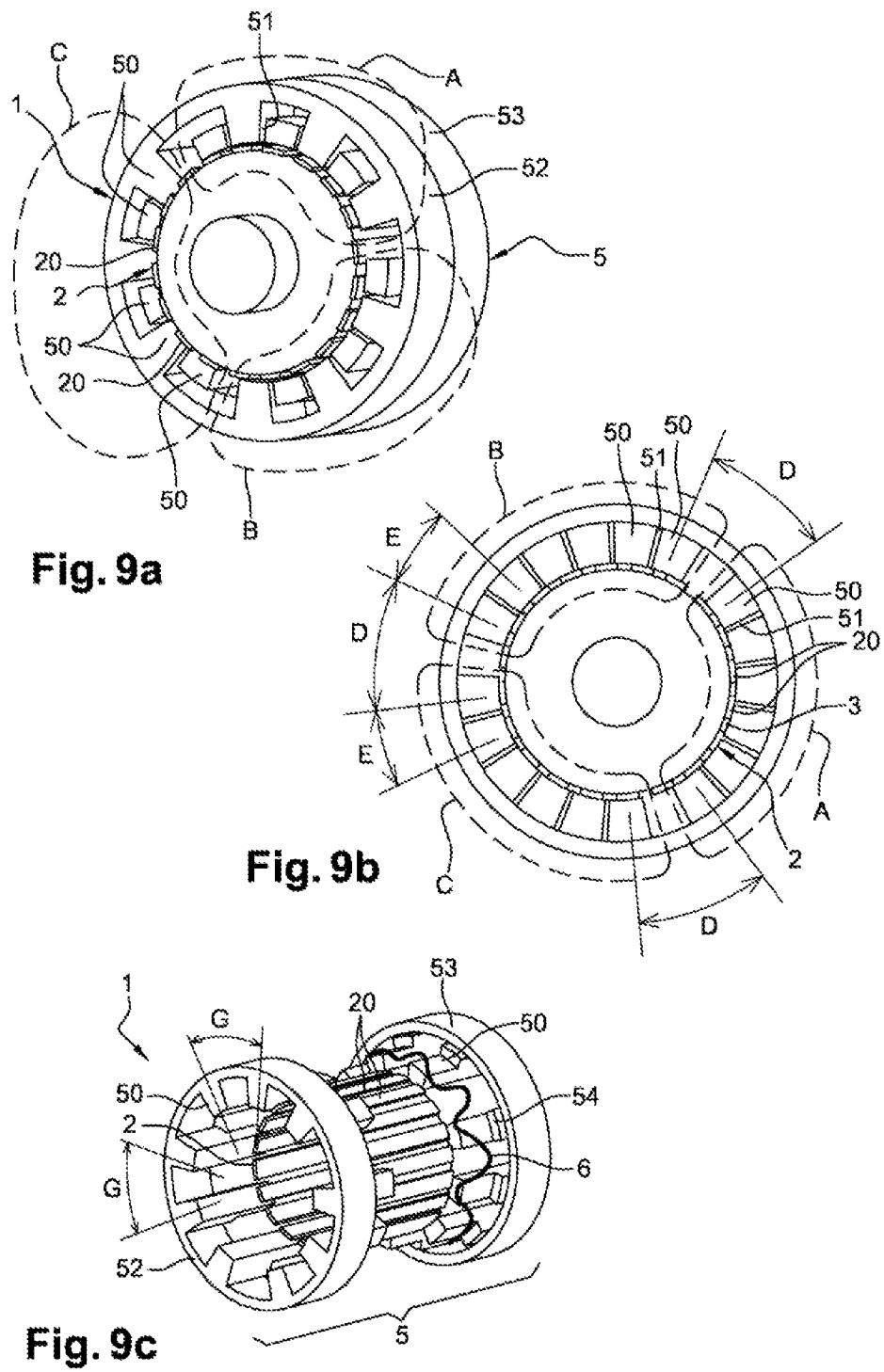

The winding is associated with each stud by being wound around the stud, in a so-called imbricated or looped manner, or else is laid alternately against just one of the pole faces of each stud zigzagging in a so-called undulating manner from alternating pole faces of each consecutive stud as illustrated in FIGS. 9c and 11a.

Alternatively, it is possible to combine undulating and imbricated styles of winding.

For preference, the windings 60, 61 and 62 are powered separately by a polyphase electrical power supply the number of phases of which corresponds to the number of groups of studs and therefore of phases of the electromagnetic assembly 1.

The windings 60, 61 and 62 are connected in a star or delta or zigzag or some other connection configuration.

In addition, advantageously, the input and the output of the electrical power supply to each winding is situated respectively at each of the end studs of each group of studs.

The field frame 5 in the example of FIGS. 2 to 5 is annular in shape. Depending on the application, geometries of field frame other than annular can be employed. By way of nonlimiting examples, FIGS. 7a to 10 illustrate a number of variations.

Figure 7A:
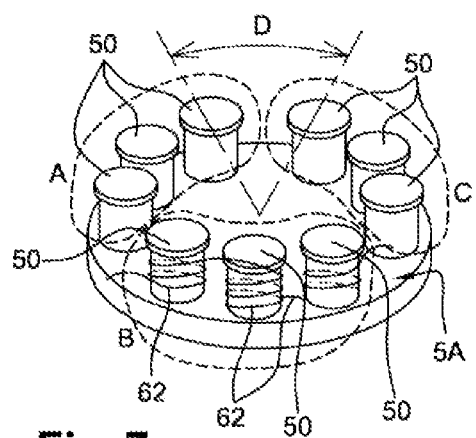
FIG. 7a illustrates a perspective view of an alternative geometric form of embodiment of a field frame of the polyphase electromagnetic assembly of the present invention, in a discoidal shape.
Figure 7B:
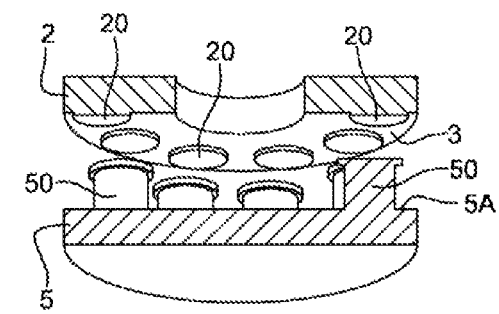
FIG. 7b is a partial view in cross section of the field frame of FIG. 7a associated with an electromagnetic element opposite to produce an airgap.

FIGS. 7a and 7b illustrate a field frame 5 of discoidal shape with studs 50 projecting from one of the faces of the field frame 5, referred to as discoidal surfaces. The electromagnetic assembly has a three-phase structure with a distribution of three groups of studs A, B and C, each group comprising, in the exemplary embodiment depicted, three studs 50 and being associated with a respective winding 60 to 62 (not depicted in FIG. 7b) wound around each stud to form a respective phase.

The groups of studs A, B and C are separated by the intergroup distance D. The electromagnetic element 2 as depicted in FIG. 7b opposite comprises a magnetic element 20, notably formed of magnets 20. The magnetic flux with the associated windings 60 to 62 is intended to be substantially axial, namely perpendicular to the support face 5A of the field frame 5 of discoidal shape.

Figure 8:
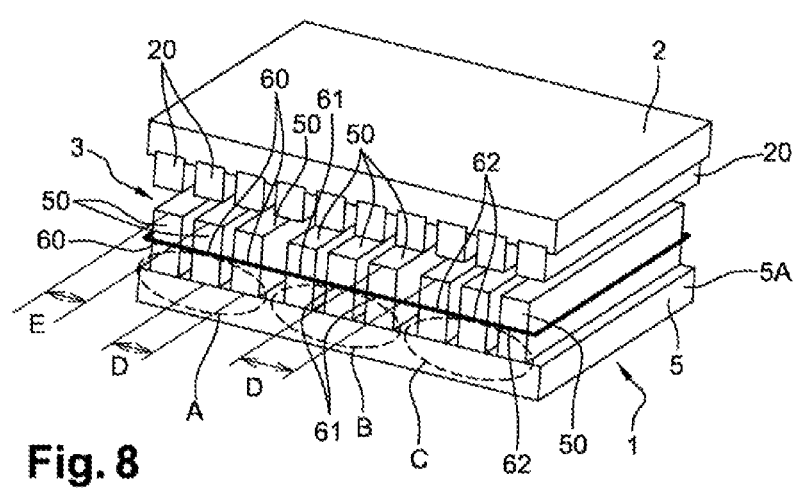
FIG. 8 illustrates a perspective view of another example of an electromagnetic assembly of the present invention, the field frame being of parallelepipedal overall shape.

FIG. 8 illustrates an electromagnetic assembly 1 of which the electromagnetic field frame 5 is of parallelepipedal shape. The electromagnetic assembly has a three-phase structure with a distribution of three groups A, B and C of parallelepipedal studs 50 each associated with a winding 60 to 62 to form the respective phases separated by an intergroup distance D. The studs 50 project from the support face 5A of the rectangular field frame 5. The electromagnetic assembly is associated with an electromagnetic element 2 opposite the studs 50 so as to form an airgap 3. The magnetic flux is intended to be perpendicular to the support face 5A of the field frame 5.

FIGS. 9a to 9c illustrate yet another exemplary embodiment of a field frame 5 of cylindrical shape for the electromagnetic assembly of the invention 1. The electromagnetic assembly 1 is associated with a magnetic element 2, notably formed of magnets 20. According to the exemplary embodiment shown, the field frame 5 comprises eighteen magnetic poles distributed in three groups of studs 50 associated with three groups of winding 60 to 62 (not depicted in FIGS. 9a and 9b) to respectively form three phases A, B and C separated by the intergroup distance D. The magnets are brought to face the studs 50, creating an airgap 3.

Advantageously, particularly to facilitate the winding of the windings around the studs 50, the field frame 5 is formed of two facing cylindrical parts 52 and 53 securely assembled with one another only after the windings have been fitted.

Each cylindrical part 52, 53 of the field frame 5 comprises half the total number of studs. For each cylindrical part 52, 53 of the field frame 5, each stud of a group is spaced, which means to say offset angularly, away from the next stud by an offset distance G designed to accommodate a stud of the cylindrical part of the field frame 5 opposite, as shown in FIG. 9c.

Once the two parts 52 and 53 have been assembled, the field frame 5 obtained constitutes a unit assembly. Furthermore, the studs 50 are arranged in such a way as to form an intergroup distance D distinct from the interstud distance E.

In one particular embodiment, the studs 50 are notched on their base to form a recess 54, setback or projecting, for winding the windings 60 to 62, notably in a wavy manner. Such a configuration of the studs 50 makes it possible to save volume parallel to the pole faces. Such a shape is usually referred to as "claw shape".

While the field frame may adopt various forms, so too the studs 50 may likewise adopt various shapes.

By way of nonlimiting examples, the studs have:
- a cylindrical shape of circular cross section, as shown in FIG. 7a;
- a cylindrical shape of polygonal cross section, as shown in FIG. 10;
- a claw shape, as shown in FIG. 9c and FIG. 11a;
- a mushroom shape, as shown in FIG. 11b;
- a divergent flared shape, as shown in FIG. 11c;
- a flared mushroom shape, as shown in FIG. 11d.

Moreover, one surface 55 of the studs, opposite to a surface of the flats secured to the support face 5A, is intended to lie opposite the magnetic element 2 and may have a shape that does not follow the shape of the line of the magnetic element 2 opposite, so as to produce an airgap that is variable. In particular, a surface shape, for example convex, may be conceived of.

The studs 50 and therefore the field frame 5 have a length L in the direction perpendicular to the pole faces, notably along the z-axis in the case of an annular or cylindrical field frame, or in the direction perpendicular to the direction in which the groups of studs are arranged.

The length L is adapted to suit the target application. For example, in the case of a motor, this length will be dependent on the desired maximum torque and on the circumference of the field frame 5 when this is annular or cylindrical.

In FIGS. 2 to 5 and 7a to 10, the exemplary embodiments of the polyphase structure electromagnetic assembly 1 are such that each of the phases corresponds to a group of studs. The groups of studs are arranged consecutively one after another and preferably each have a winding distinct from the adjacent group.

Figure 12:
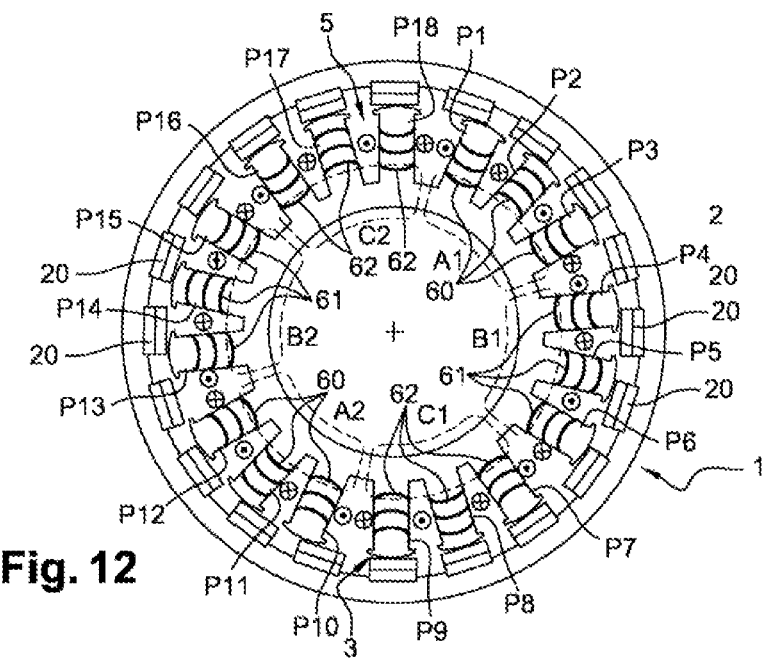
FIG. 12 is a view in cross section of another exemplary embodiment of a field frame of the electromagnetic assembly of the present invention.

In an alternative form of the embodiment illustrated in FIG. 12, each phase corresponds to the combination of at least two distant groups, which means to say two groups that do not follow on from one another consecutively, associated with the one same winding distinct from the winding of the other groups. The distant groups associated with the one same winding are referred to as subgroups.

The field frame 5b of FIG. 6 is equivalent to the field frame 5 of FIG. 12 in terms of the distribution of the studs, the difference lying in the fact that the studs in FIG. 6 are on the internal face 5B of the field frame 5 whereas the studs in FIG. 12 are on the external face 5A of the field frame 5.

The polyphase structure electromagnetic assembly 1 of FIG. 12 is associated with a magnetic element 2 opposite, particularly made up of magnets 20, arranged a distance away in order to provide an airgap 3.

The field frame 5 of the polyphase structure electromagnetic assembly 1 is annular in shape, two subgroups of studs, particularly a pair of distant and nonadjacent groups, intended to form a phase with the associated winding are therefore arranged diametrically opposite.

By way of example, the field frame 5 comprises eighteen studs numbered from P1 to P18 and distributed in six subgroups A1, B1, C1, A2, B2, C2 of three studs each. The first phase corresponds to the two diametrically opposite subgroups A1 and A2 with the studs numbered P1, P2, P3 on the one hand and P10, P11, P12 on the other. The second phase corresponds to the two diametrically opposite subgroups B1 and B2 with the studs P4, P5, P6 on the one hand and P13, P14, P15 on the other. The third phase corresponds to the two diametrically opposite subgroups C1-C2 comprising the studs P7, P8, P9 on the one hand and P16, P17, P18 on the other. The adjacent groups of studs, or subgroups, A1 to C2 are preferably equidistant from one another, which means to say the intergroup distance is identical.

A respective winding 60, 61 and 62 is associated with each pair of subgroups A1 and A2, B1 and B2, C1 and C2, to form the three phases respectively.

Figure 13:
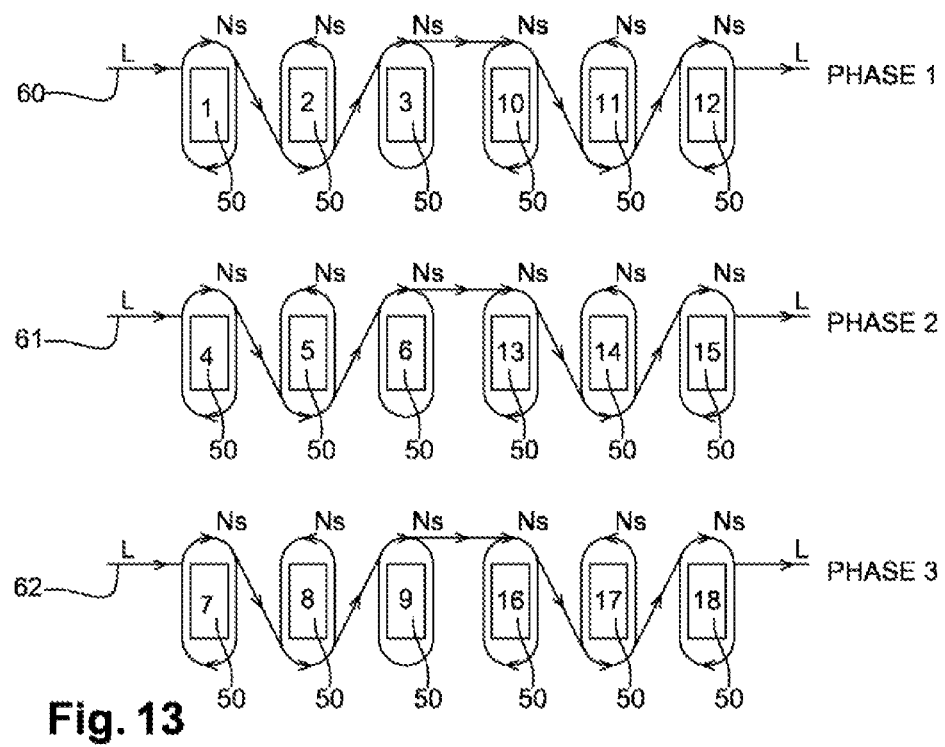
FIG. 13 is a schematic view of windings associated with the field frame of FIG. 12.

FIG. 13 schematically depicts each of the windings 60 to 62 of the three phases. Each respective winding passes around the studs of each pair of subgroups.

According to one particular embodiment, the first winding 60 is associated with the studs P1, P2, P3, P10, P11 and P12, the electrical power supply input being at stud P1 and the output at stud P12. The second winding 61 is associated with the studs P4, P5, P6, P13, P14, P15, the electrical power supply input being at stud P4 and the output at stud P15. The third winding 62 is associated with the studs P7, P8, P9, P16, P17 and P18, the electrical power supply input being at stud P7 and the output at stud P18. The direction of the current is symbolized by the arrows in FIG. 13.

The windings 60, 61 and 62 are powered separately by a polyphase electric power supply the number of phases of which corresponds to the number of pairs of subgroups of studs.

Whatever the embodiment, (each phase corresponding to each group of studs, each group considered consecutively, or else each phase corresponding to at least two nonconsecutive groups of studs called subgroups) a phase angle θ between the phases is given, in a preferred embodiment, by the following formula, which is expressed in terms of electrical angle:

for an odd number of phases:
 θ=180°/number of phases if the number of studs per subgroup is odd
 θ=360°/number of phases if the number of teeth per subgroup is even
for an even number of phases:
 θ=180°/number of phases Each group, or subgroup, of studs preferably comprises an identical number of studs 50. Alternatively, according to specific exemplary embodiments, the groups of studs may contain different numbers of studs 50.

Finally, the number of magnetic poles Np of the magnetic element 2, particularly a rotor according to the exemplary embodiment presented, opposite the polyphase structure electromagnetic assembly 1 of the present invention is dependent on the number of studs 50 of the polyphase structure electromagnetic assembly 1 and on the number of groups of studs.

The number of magnetic poles Np can be expressed in a preferred embodiment as follows:

$$Np=(Nphases*Nsubgroups*Nstuds\text{-}subgroup)+kd$$

Where Nphases is the number of phases,
Nsubgroups is the number of subgroups,
Nstuds-subgroup is the number of studs per subgroup, and
if the number of phases is even
Kd=Nsubgroups
if the number of phases is odd and
if Nstuds-subgroup is odd, Kd=Nsubgroups
 or
if Nstuds-subgroup is even Kd=2*Nsubgroups Of course, the invention is not limited to the embodiments described hereinabove and provided solely by way of example. It encompasses various modifications, alternative forms and other alternative variations that a person skilled in the art might conceive of within the context of the present invention and particularly all combinations of the various modes of operation described hereinabove, which may be considered separately or in combination.

What is claimed is:

1. A polyphase structure electromagnetic assembly comprising:
- a field frame having an electromagnetic body,
- a plurality of studs spaced apart and projecting from a support face of the field frame and arranged consecutively along the periphery of the support face of the field frame, and
- at least one winding associated with the studs, wherein:
  - the field frame is the only field frame in the assembly, and
  - the plurality of studs are arranged in at least two groups of studs (A, B, C), in which two consecutive studs of the one same group of studs (A, B, C) are spaced apart by an interstud distance (E) and each group of studs (A, B, C) is separated from the adjacent group of studs (A, B, C) by an intergroup distance (D) distinct from the interstud distance (E), and wherein one or more studs extend radially outward from the field frame and are attached removably against the field frame,
- wherein the winding is produced:
  - in a wavy fashion, passing from one stud to another, passing alternately from one pole face of one stud to an opposite pole face for the next stud, or
  - in an imbricated manner, passing fully around each of the studs.

2. The polyphase structure electromagnetic assembly as claimed in claim 1, wherein the body of the field frame is annular, or cylindrical in one or two annular parts, or cylinders butted together, or discoidal, or parallelepipedal.

3. The polyphase structure electromagnetic assembly as claimed in claim 1, wherein the assembly comprises several phases so that each phase corresponds:
- either to each of the groups of studs (A, B, C), the groups being considered consecutively, wherein a distinct winding is associated with each group,
- or to the combination of at least two distant groups of studs (A1, A2; B1, B2; C1, C2) associated with at least the one same winding distinct from the winding of the other groups.

4. The polyphase structure electromagnetic assembly as claimed in claim 1, wherein the intergroup distances (D) are identical over the entire field frame.

5. The polyphase structure electromagnetic assembly as claimed in claim 4, wherein each of the intergroup distances (E) is equal to an electrical angle which corresponds to:
- 180°/Nphases, when the number of phases is odd, and
- 360°/Nphases, when the number of phases is even,
- where Nphases is the number of phases.

6. The polyphase structure electromagnetic assembly as claimed in claim 3, wherein a subgroup is the combination of at least two distant groups of studs (A1, A2; B1, B2; C1, C2) associated with at least the one same winding distinct from the winding of the other groups, a number of subgroups of studs being preferably an even number and/or the number of groups corresponding to the number of phases is preferably an odd number.

7. The polyphase structure electromagnetic assembly as claimed in claim 3, wherein the structure is a three-phase structure that comprises:
- either three groups of studs (A, B, C), each of the groups corresponding to one phase,
- or three pairs of subgroups of studs (A1, A2; B1, B2; C1, C2), each pair of subgroups of studs (A1, A2; B1, B2; C1, C2) corresponding to one phase and the two subgroups of each pair being arranged diametrically opposite and associated with the one same winding.

8. The polyphase structure electromagnetic assembly as claimed in claim 3, wherein each group of studs or each subgroup comprises an identical number of studs.

9. The polyphase structure electromagnetic assembly as claimed in claim 3, wherein the assembly comprises one winding per group of studs or per combination of subgroups, which is formed of one or more turns associated with each of the studs.

10. The polyphase structure electromagnetic assembly as claimed in claim 1, wherein a subgroup is the combination of at least two distant groups of studs (A1, A2; B1, B2; C1, C2) associated with at least the one same winding distinct from the winding of the other groups, the winding of each group or combination of subgroups for each phase being angularly set with respect to the electrical phase angle between the phases.

11. The polyphase structure electromagnetic assembly as claimed in claim 1, wherein the studs have various shapes such as a cylindrical shape of circular or polygonal base, or a mushroom shape, or a flared solid shape preferably diverging toward the opposite side from the support face, and/or a solid shape having a recess on at least one of the pole faces (F).

12. The polyphase structure electromagnetic assembly as claimed in claim 1, wherein each stud has a surface opposite to the support face of the field frame and intended to face an airgap, having a convex shape.

13. A device comprising a polyphase structure electromagnetic assembly as claimed in claim 1 and an electromagnetic element arranged opposite and some distance away in order to create an airgap between the electromagnetic element and the electromagnetic assembly.

* * * * *